(12) United States Patent
Schultz et al.

(10) Patent No.: US 8,793,038 B1
(45) Date of Patent: Jul. 29, 2014

(54) PROVIDING PREVIEW INFORMATION TO FACILITATE FLIGHT PLAN SELECTION

(75) Inventors: Bryan C. Schultz, Marion, IA (US); Colin D. Reed, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 42 days.

(21) Appl. No.: 13/325,784

(22) Filed: Dec. 14, 2011

(51) Int. Cl.
*G01C 21/00* (2006.01)

(52) U.S. Cl.
USPC ............... 701/3; 701/400; 701/401; 701/411; 701/418; 701/467; 340/995.1; 340/995.14; 340/995.19

(58) Field of Classification Search
CPC ................................. G01C 21/00; G01C 21/20
See application file for complete search history.

(56) References Cited

U.S. PATENT DOCUMENTS

| | | | | |
|---|---|---|---|---|
| 5,715,163 A * | 2/1998 | Bang et al. | | 701/467 |
| 5,991,688 A * | 11/1999 | Fukushima et al. | | 701/411 |
| 6,112,141 A * | 8/2000 | Briffe et al. | | 701/14 |
| 6,199,015 B1 * | 3/2001 | Curtwright et al. | | 701/455 |
| 6,314,370 B1 * | 11/2001 | Curtright | | 701/412 |
| 6,633,810 B1 * | 10/2003 | Qureshi et al. | | 701/467 |
| 6,922,631 B1 * | 7/2005 | Dwyer et al. | | 701/528 |
| 7,363,119 B2 * | 4/2008 | Griffin et al. | | 701/3 |
| 7,724,240 B2 * | 5/2010 | Gyde et al. | | 345/168 |
| 7,765,060 B1 * | 7/2010 | Kennedy | | 701/532 |
| 7,809,479 B2 * | 10/2010 | Chen et al. | | 701/3 |
| 7,813,845 B2 * | 10/2010 | Doose et al. | | 701/16 |
| 7,844,372 B2 * | 11/2010 | Chen et al. | | 701/11 |
| 8,050,860 B2 * | 11/2011 | Peyrucain et al. | | 701/467 |
| 8,150,623 B2 * | 4/2012 | Bitar et al. | | 701/467 |
| 8,159,464 B1 * | 4/2012 | Gribble et al. | | 345/173 |
| 8,223,119 B1 * | 7/2012 | Krenz et al. | | 345/156 |
| 8,370,005 B2 * | 2/2013 | Wilson et al. | | 701/16 |
| 8,380,366 B1 * | 2/2013 | Schulte et al. | | 701/3 |
| 8,432,298 B2 * | 4/2013 | McCullough | | 340/979 |
| 8,694,184 B1 * | 4/2014 | Boorman et al. | | 701/14 |
| 2005/0049762 A1 * | 3/2005 | Dwyer | | 701/3 |
| 2005/0137758 A1 * | 6/2005 | He et al. | | 701/3 |
| 2006/0129438 A1 * | 6/2006 | Robinson | | 705/6 |
| 2006/0259234 A1 * | 11/2006 | Flynn et al. | | 701/202 |
| 2007/0142981 A1 * | 6/2007 | Gutierrez-Castaneda et al. | | 701/3 |
| 2007/0168120 A1 * | 7/2007 | Vandenbergh et al. | | 701/208 |
| 2008/0154486 A1 * | 6/2008 | Coulmeau | | 701/120 |
| 2008/0195309 A1 * | 8/2008 | Prinzel, III et al. | | 701/208 |
| 2009/0125222 A1 * | 5/2009 | McCullough et al. | | 701/120 |
| 2010/0023189 A1 * | 1/2010 | Suddreth et al. | | 701/16 |
| 2010/0030401 A1 * | 2/2010 | Rogers et al. | | 701/3 |
| 2010/0106346 A1 * | 4/2010 | Badli et al. | | 701/3 |
| 2010/0250026 A1 * | 9/2010 | Deker et al. | | 701/3 |
| 2011/0102199 A1 * | 5/2011 | McCullough | | 340/979 |
| 2011/0130897 A1 * | 6/2011 | Gladysz et al. | | 701/15 |
| 2012/0035849 A1 * | 2/2012 | Clark et al. | | 701/467 |
| 2012/0259669 A1 * | 10/2012 | Stilwell et al. | | 705/5 |
| 2013/0006511 A1 * | 1/2013 | Ramaiah et al. | | 701/120 |

\* cited by examiner

*Primary Examiner* — Jonathan M Dager
(74) *Attorney, Agent, or Firm* — Donna P. Suchy; Daniel M. Barbieri

(57) ABSTRACT

A method and system for providing flight plan (i.e., route) previews is disclosed. A graphical representation of a route is provided on a display for a user to preview prior to committing the route to a flight management system. Furthermore, a textual description of the route may also be displayed. The textual description may provide additional information that may further assist the user making the selection.

19 Claims, 4 Drawing Sheets

US 8,793,038 B1

PROVIDING PREVIEW INFORMATION TO FACILITATE FLIGHT PLAN SELECTION

TECHNICAL FIELD

The present disclosure relates generally to display systems and more particularly to providing flight plan previews.

BACKGROUND

Flight planning is a process of producing a flight plan to describe a proposed aircraft flight. Several different flight plans (may also be referred to as routes) may be prepared ahead of time which may require the selection of a particular route from a list of these available routes. Each available route may be associated with a unique name, allowing the user (e.g., pilot, flight planner or the like) to make the selection from a list of such names.

One of the common ways to name a route is to incorporate the identifiers of some of the locations that the route travels through into the name. While such a naming convention may carry certain meanings to experienced users, it is not as meaningful to other users since it requires understandings of the location identifiers and their corresponding geological locations in order to interpret the meaning. It is understood that other naming conventions also have similar shortcomings.

Therein lies a need for providing additional information that further describes the available/candidate routes during this selection process.

SUMMARY

The present disclosure is directed to a method for providing route previews during the selection process. The method may display a plurality of available routes on a display module. Upon receiving a selection of a particular route selected from the plurality of available routes, the method may display a graphical representation of the particular route on the display module. The method may receive a command input which may include an acceptance input or a rejection input. The method may execute the particular route upon receiving the acceptance input.

Another embodiment of the present disclosure is directed to a system for providing route previews. The system may include a display module, an input module and a processing unit. The display module may display a plurality of available routes. The input module may receive a selection of a particular route from the plurality of available routes and prompt the display module to display a graphical representation of the particular route. The input module may also receive a command input which may include an acceptance input or a rejection input. The processing unit may execute the particular route upon receiving the acceptance input.

It is to be understood that both the foregoing general description and the following detailed description are exemplary and explanatory only and are not restrictive of the invention claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous objects and advantages of the present invention may be better understood by those skilled in the art by reference to the accompanying figures in which.

DETAILED DESCRIPTION

Reference will now be made in detail to exemplary embodiments of the disclosure, examples of which are illustrated in the accompanying drawings.

Flight planning generally includes a selection process for selecting a particular route to a given destination. This selection process may be performed prior to the departure of the aircraft and/or during the flight of the aircraft (e.g., if the previously selected route is no longer available due to reasons such as closure of an airspace, weather concerns or the like). A route may be selected from one or more candidate routes available to the aircraft. It is contemplated that some of these candidate routes may be uploaded to the aircraft by a flight planning service via a data communication device (e.g., utilizing a datalink system). In addition, a pilot may also enter/provide additional pilot-defined routes to the aircraft.

The present disclosure is directed to a method and system for providing route previews during the selection process. In one embodiment, a graphical representation of a route is provided on the display for the user/pilot to preview prior to making a selection. Furthermore, a textual description of the route may also be displayed. The textual description may provide additional information that may further assist the user making the selection.

Figure 1:
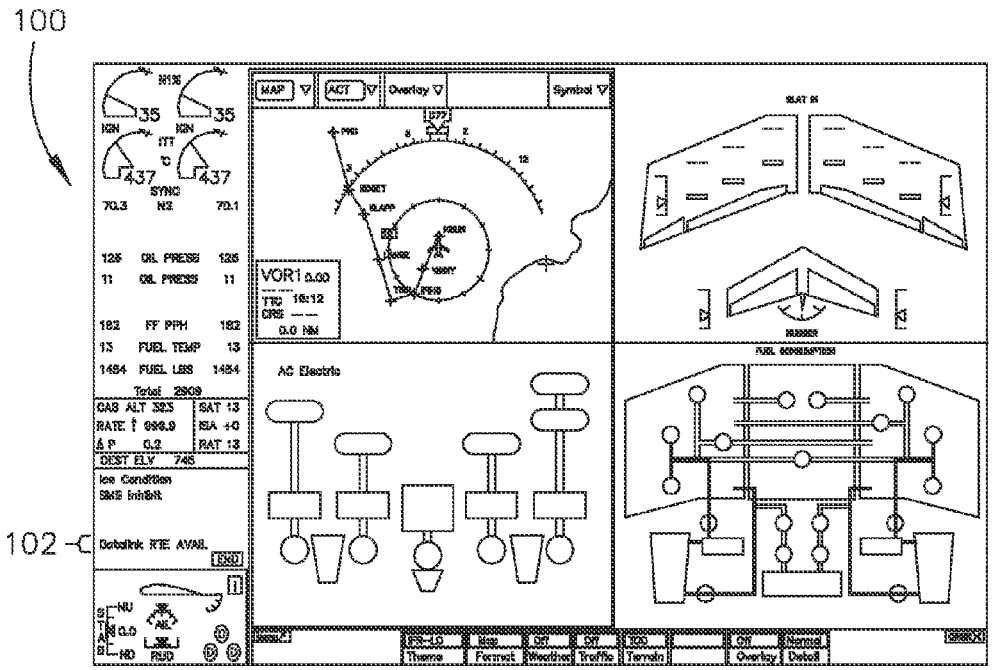
FIG. 1 is an illustration depicting contents displayed on a display module.

Referring generally to FIGS. 1 through 5, a display module 100 configured for providing information display to the pilot is shown. It is understood that the display module 100 may be implemented utilizing a single screen display. Alternatively, a multi-screen implementation may also be utilized without departing from the spirit and scope of the present disclosure. In either implementation, the display module 100 may be configured for displaying information in various configurable ways. For instance, as illustrated in FIG. 1, information such as maps, fuel levels, diagnostic data, weather information, flight conditions and various other types of information may be displayed.

The display module 100 may also be configured to provide an indication to the pilot when candidate routes are available for selection. For instance, an indicator 102 may be displayed when at least one candidate route is available for selection. Additionally, the indicator 102 may be configured to signal a reception of a new candidate route (e.g., newly uploaded to the aircraft via a datalink system or the like). For instance, the indicator 102 may provide a visual cue (e.g., changes font/size, color scheme, blinking or the like) to signal the reception of a new candidate route. Such a signal may be appreciated in certain situations. For example, if a new route is made available because of an opening of a previously restricted airspace, the new route may be uploaded to the aircraft during its flight, and the indicator 102 may signal the reception of this new route for the pilot's consideration.

A route selection page may be displayed on the display module 100 to facilitate the route selection process. The pilot may configure the display module 100 to display the route selection page by issuing a route selection command. Various input mechanisms may be utilized to issue such a command. For instance, if the display module 100 includes a touch sensitive screen, the route selection command may be issued when the pilot touches the indicator 102 displayed on the display module 100. Other pointing devices such as a mouse, a touchpad, a joystick, a trackball or the like may be utilized in a similar manner. It is contemplated that other types of input mechanisms (e.g., a keyboard, a knob, a voice command receiver or the like) may also be utilized to issue the route selection command without departing from the spirit and scope of the present disclosure.

Figure 2:
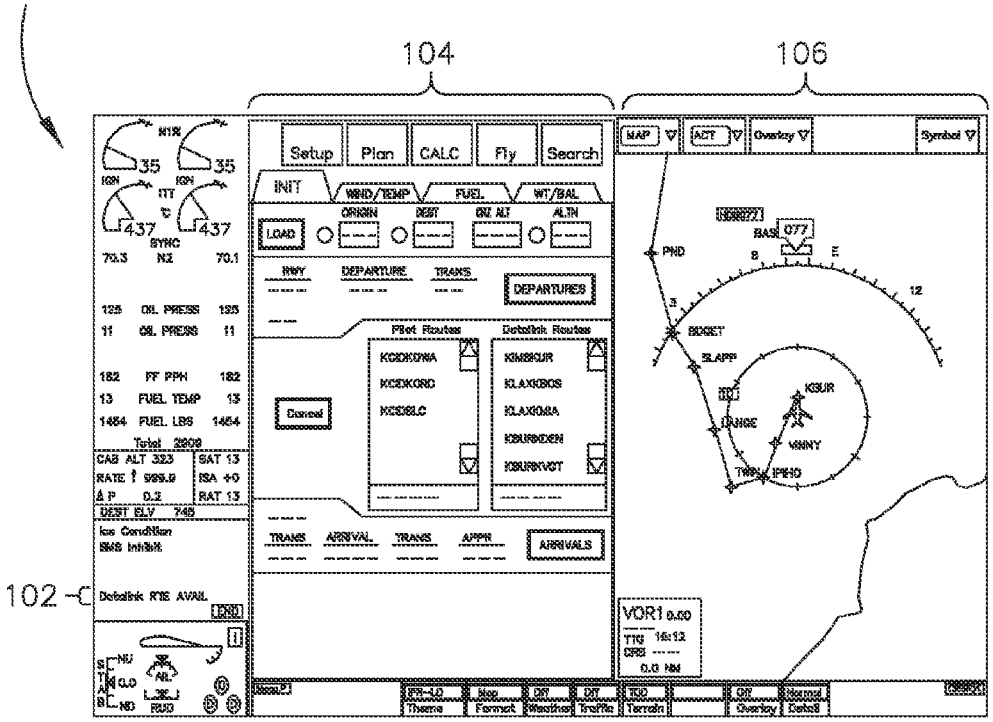
FIG. 2 is an illustration depicting the display module, wherein the available routes are presented on the display module.

In one embodiment, the route selection page is configured to present at least two non-overlapping portions on the display module 100 as shown in FIG. 2. The non-overlapping portions may include a route selection portion 104 and a map preview portion 106. The route selection portion 104 may display the available routes for the pilot to select from. The available routes may be displayed as a list, which may include the routes uploaded via a datalink, entered by the pilot, or both. Alternatively, more than one list may be utilized to display the available routes, which may be separated based on whether they are uploaded via a datalink or entered by the pilot. It is contemplated that other techniques may also be utilized to display the available routes in the route selection portion 104.

The pilot may take one or more available routes into consideration before committing to a specific route for the flight. The map preview portion 106 in accordance with the present disclosure is configured to facilitate this process. For instance, the pilot may select any of the available routes from the route selection portion 104 to activate a preview for this route in the map preview portion 106.

Figure 3:
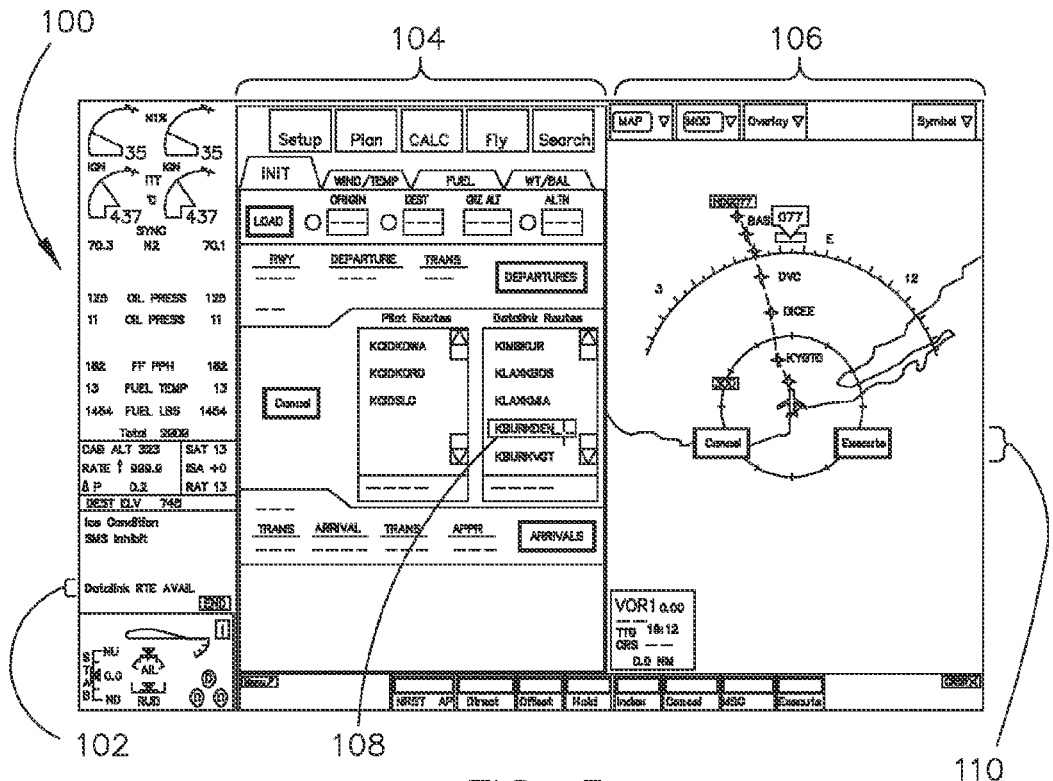
FIG. 3 is an illustration depicting the display module, wherein a preview of a particular route is presented on the display module.

In the example illustrated in FIG. 3, the pilot may select a particular route 108 for a preview. It is understood that various types of input mechanisms (e.g., a touch input, a pointing device, a keyboard, a knob, a voice command or the like) may be utilized for making such a selection. Once a particular route 108 is selected, a graphical representation of the selected route 108 is then displayed in the map preview portion 106. In one embodiment, the graphical representation of the selected route 108 may display the entire route on a map, allowing the pilot to preview the entire route from the current position of the aircraft to the destination location. Location indicators and/or flight plan symbology may also be provided in this graphical representation.

It is contemplated that user interactions with the graphical representation may be supported. In this manner, the pilot may manipulate the graphical representation of the selected route 108 utilizing certain graphic control input/command. For example, the pilot may adjust the magnification level of the graphical representation (may also be referred to as zoom in or zoom out) in order to see more or less details of the route being displayed. In another example, the pilot may scroll the graphical representation (may also be referred to as pan) vertically, horizontally, diagonally or the like in order to view contents that are not currently being displayed.

It is also contemplated that the graphical representation of the selected route being displayed for preview purposes may provide a visual cue to indicate that such a route has not yet been committed to the system. For example, as illustrated in FIG. 3, a dashed line may be utilized to indicate that the route being displayed in the map preview portion 106 is being displayed for preview purposes and has not been committed to the system yet. Alternative/additional visual cues, such as a specific thickness or coloring of the line may also be utilized.

Upon reviewing the graphical representation of the selected route in the map preview portion 106, the pilot may choose to select the route as the committed route for the flight (i.e., accepting the route displayed in the map preview portion 106), or the pilot may choose to continue to consider other available routes before making a decision (i.e., rejecting the route displayed in the map preview portion 106). The pilot may indicate whether to accept or reject the route via a command input. In one embodiment, the command input may be provided utilizing the command prompt 110 displayed on the display module 100.

For instance, the pilot may use the "cancel" button to reject the route currently being displayed and subsequently select another route from the route selection portion 104 for additional consideration. Alternatively, the pilot may directly select another route from the route selection portion 104, and the route currently being displayed may be automatically rejected. On the other hand, the pilot may use the "execute" button to accept the route currently being displayed in the map preview portion 106 as the committed route for the flight.

Figure 4:
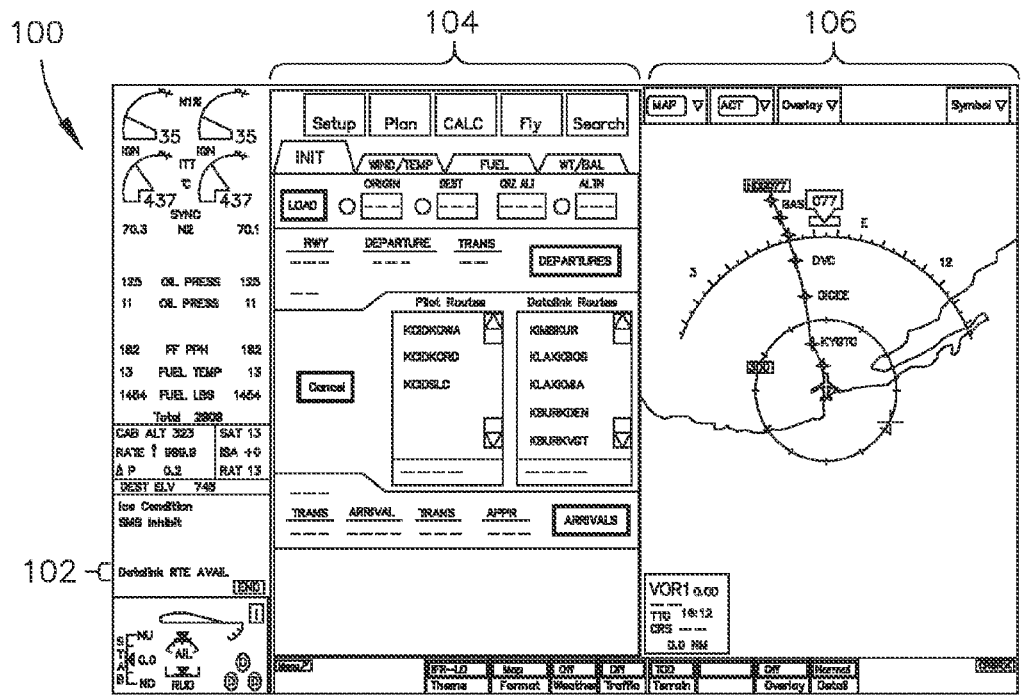
FIG. 4 is an illustration depicting the display module, wherein a particular route is selected for the flight.

Once the acceptance command is received, the particular route that is displayed in the map preview portion 106 is considered to be the committed route for the flight. This route may then be communicated to a flight management system (FMS) or any control system that may need such information to execute and manage the flight of the aircraft. In one embodiment, as illustrated in FIG. 4, the committed route may be visually distinct from the others when displayed in the map preview portion 106. For instance, the committed route may be displayed using solid lines while dashed lines may be used for the other routes. Such distinctions may be appreciated when the pilot choose to preview other available routes after having committed to a particular route (e.g., when a new route is made available due to various reasons).

It is contemplated that the map preview portion 106 may be configured for displaying more than one route at a time. For instance, it may be appreciated to provide the ability for the pilot to visually compare two or more routes in the map preview portion 106. The pilot may select more than one route from the route selection portion 104, and the map preview portion 106 may display graphical representations of the selected routes in the map preview portion 106. As described previously, visual cues may be utilized to indicate whether any of the routes displayed has been committed to the system already. For example, if none of the routes displayed in the map preview portion 106 is a committed route, then they may all be displayed using dashed lines (while additional visual cues may be utilized to further distinguish one route from another). On the other hand, if one of the routes displayed in the map preview portion 106 is the committed route, the committed route may be displayed using a solid line to distinguish itself from other available routes displayed in the map preview portion 106. The pilot may also deselect/remove any of the routes from being displayed in the map preview portion 106.

It is understood that the command prompt 110 described above is merely exemplary. Various types of input mechanisms may be utilized to issue the command input to accept or reject a route without departing from the spirit and scope of the present disclosure. In addition, it is contemplated that a computer-aided selection process may be configured to issue the command input. For example, a rejection input may be issued automatically if a route is displayed in the map preview portion 106 for more than a predetermined duration without receiving any command input. In another example, the computer-aided selection process may be configured to analyze the route displayed in the map preview portion 106 and automatically issue an acceptance input if the displayed route satisfies certain selection criteria.

It is also contemplated that the route selection portion 104 and the map preview portion 106 may be simultaneously displayed on the display module 100. In one embodiment, the route selection portion 104 and the map preview portion 106 may be positioned side-by-side and each occupy a display area having a size same or similar to each other. However, such a configuration is exemplary. The pilot may resize and/or move the route selection portion 104 or the map preview portion 106 based on his/her preference.

Figure 5:
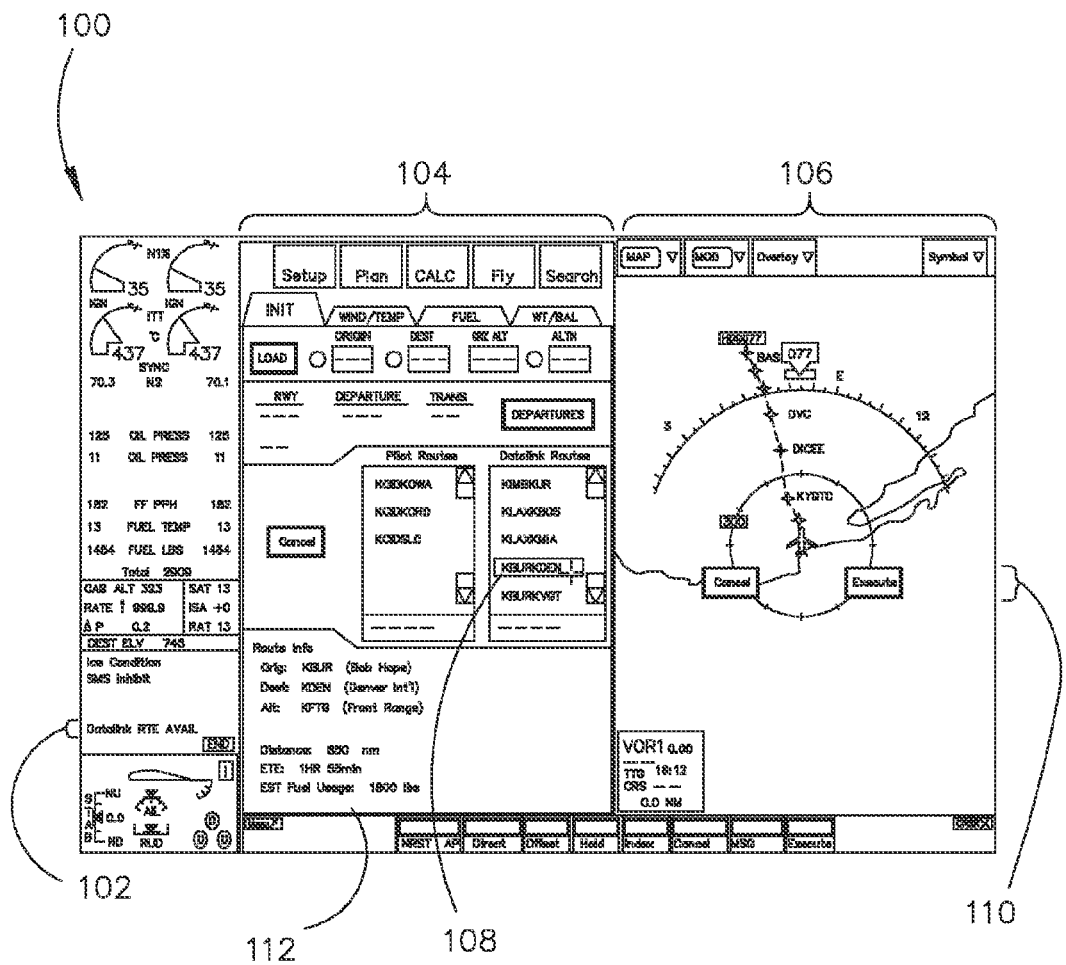
FIG. 5 is an illustration depicting the display module, wherein additional textual description is presented on the display module.

It is further contemplated that the display module 100 may be configured to further provide a textual description 112 of the route displayed in the map preview portion 106 as illustrated in FIG. 5. The textual description 112 of the route may include information about locations along the route, total distance, estimated time en route, estimated fuel consumption, expected weather patterns along the route and various other information related to the route. It is understood that some of the information (e.g., locations) may be obtained from the route directly, while some other information may be computed and/or retrieved from other systems such as the flight management system or the like. In one embodiment, the available routes displayed in the route selection portion 104, the graphical representation displayed in the map preview portion 106 and the textual description 112 are displayed simultaneously on the display module 100 without overlapping.

Figure 6:
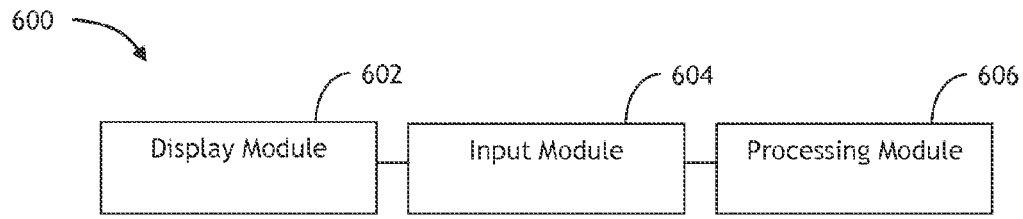
FIG. 6 is a block diagram depicting a system for providing flight plan preview in accordance with the present disclosure.

Referring to FIG. 6, a block diagram depicting a system 600 for providing flight plan (i.e., route) preview is shown. The system 600 may include a display module 602 as described above. The system 600 may also include an input module 604 in communication with the display module 602. The input module 604 may be a touch sensitive layer integrated into the display module 602, a pointing device, or other types of input mechanisms previously described. The system 600 may further include a processing unit 606 in communication with the input module 604. The processing unit 606 may be configured for executing user commands received via the input module 604.

In one embodiment, the display module 602 may display the route selection page as described above, wherein the available routes are provided on the display module 602 for the user to select from. The selection of a particular route may be received at the input module 604, which in turn may prompt the display module 602 to display a graphical representation of that particular route. The input module 604 may also support a graphic control input from the user to manipulate the graphical representation of the route. For instance, the user may adjust the magnification level of the graphical representation and/or scroll the graphical representation.

The input module 604 may also receive a command input to accept or reject the particular route currently being displayed. If the acceptance input is received, this particular route is then considered to be the committed route for the flight, and the processing unit 606 may execute accordingly and communicated this committed route to the FMS or any control system that may need such information to execute and manage the flight of the aircraft.

It is contemplated that the route preview system 600 in accordance with the present disclosure may be implemented in a separate system communicatively connected to the FMS. Alternatively, the route preview system 600 may be implemented as an integrated part of the FMS or any existing system on board the aircraft. In this manner, the route preview system 600 in accordance with the present disclosure may be implemented without requiring any additional hardware equipment.

Figure 7:
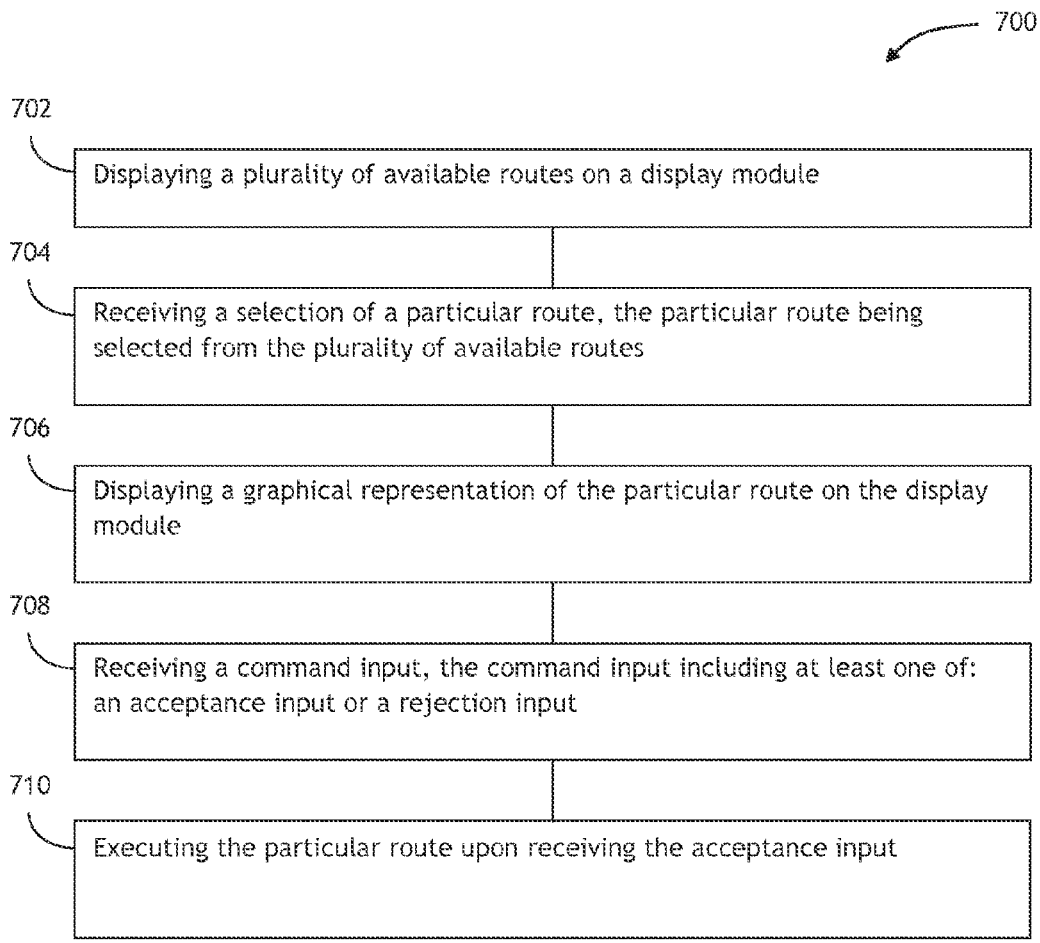
FIG. 7 is a flow diagram illustrating a method for providing flight plan preview in accordance with the present disclosure.

Referring now to FIG. 7, a method 700 for providing route preview in accordance with the present disclosure is shown. Step 702 may display a plurality of available routes on a display module. Step 704 may receive a selection of a particular route selected from the plurality of available routes. Step 706 may display a graphical representation of the particular route that is selected for preview purposes as described above. User interactions with the graphical representation may be supported to allow the user to adjust the magnification level of the graphical representation or scroll the graphical representation.

A command input indicating whether to accept the particular route may be received in step 708, and step 710 may execute this selected route upon receiving the acceptance input. For instance, this selected route may be communicated to the FMS or any control system that may need such information to execute and manage the flight of the aircraft. On the other hand, upon receiving a rejection input, the selection may be discarded and the method 700 may repeat from step 702 to facilitate the selection process again.

It is to be understood that the present disclosure may be conveniently implemented in forms of a software package. Such a software package may be a computer program product which employs a computer-readable storage medium including stored computer code which is used to program a computer to perform the disclosed function and process of the present invention. The computer-readable medium may include, but is not limited to, any type of conventional floppy disk, optical disk, CD-ROM, magnetic disk, hard disk drive, magneto-optical disk, ROM, RAM, EPROM, EEPROM, magnetic or optical card, or any other suitable media for storing electronic instructions.

It is understood that the present disclosure is not limited to any underlying implementing technology. The present disclosure may be implemented utilizing any combination of software and hardware technology. The present disclosure may be implemented using a variety of technologies without departing from the scope and spirit of the disclosure or without sacrificing all of its material advantages.

It is understood that the specific order or hierarchy of steps in the processes disclosed is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

It is believed that the present disclosure and many of its attendant advantages will be understood by the foregoing description, and it will be apparent that various changes may be made in the form, construction, and arrangement of the components thereof without departing from the scope and spirit of the disclosure or without sacrificing all of its material advantages. The form herein before described being merely an explanatory embodiment thereof, it is the intention of the following claims to encompass and include such changes.

What is claimed is:

1. A method for providing flight plan preview, the method comprising:
   displaying a list of available routes on a display module, wherein each route of the list of available routes is identified based on a data source, and wherein the data source identified indicates the route being one of: a pilot-defined route and a route received via a data communication device;
   receiving a selection of a particular route, the particular route being selected from the list of available routes;
   displaying a graphical representation of only the particular route selected on the display module, wherein the graphical representation of the particular route and the list of available routes are displayed on the display module simultaneously without overlapping;
   receiving a command input, the command input including at least one of: an acceptance input or a rejection input; and
   executing the particular route upon receiving the acceptance input.

2. The method of claim 1, wherein the graphical representation of the particular route represents the particular route in its entirety.

3. The method of claim 1, wherein said displaying a graphical representation of the particular route comprises:
   displaying the graphical representation of the particular route, the graphical representation configured for representing the particular route in its entirety by default; and
   supporting a graphic control input, the graphic control input configured for at least one of: adjusting a magnification level of the graphical representation or scrolling the graphical representation.

4. The method of claim 1, further comprising:
   displaying a textual description of the particular route on the display module.

5. The method of claim 4, wherein the list of available routes, the graphical representation of the particular route and the textual description of the particular route are displayed simultaneously without overlapping.

6. The method of claim 1, wherein the list of available routes comprises a first list of pilot-defined routes and a second list of routes received via the data communication device.

7. The method of claim 6, further comprising:
   signaling a reception of a route received via the data communication device.

8. A system for providing flight plan preview, the apparatus comprising:
   a display module, the display module configured for displaying a list of available routes, wherein each route of the list of available routes is identified based on a data source, and wherein the data source identified indicates the route being one of: a pilot-defined route and a route received via a data communication device;
   an input module in communication with the display module, the input module configured for receiving a selection of a particular route from the list of available routes, prompting the display module to display a graphical representation of only the particular route selected with the list of available routes simultaneously without overlapping, and receiving a command input including at least one of: an acceptance input or a rejection input; and
   a processing unit in communication with the input module, the processing unit configured for executing the particular route upon receiving the acceptance input.

9. The system of claim 8, wherein the graphical representation of the particular route displayed on the display module represents the particular route in its entirety by default.

10. The system of claim 9, wherein the input module is further configured for supporting a graphic control input, the graphic control input configured for at least one of: adjusting a magnification level of the graphical representation or scrolling the graphical representation.

11. The system of claim 8, wherein the display module is further configured for displaying a textual description of the particular route.

12. The system of claim 11, wherein the list of available routes, the graphical representation of the particular route and the textual description of the particular route are displayed on the display module simultaneously without overlapping.

13. The system of claim 8, wherein the list of available routes comprises a first list of pilot-defined routes and a second list of routes received via the data communication device.

14. The system of claim 13, wherein the display module is further configured for signaling a reception of a route received via the data communication device.

15. A method for providing flight plan preview, the method comprising:
   displaying a plurality of available routes on a display module, wherein the plurality of available routes includes a first list of pilot-defined routes and a second list of routes received via a data communication device, and wherein the first list and the second list are displayed separately;
   receiving a selection of a particular route, the particular route being selected from the plurality of available routes;
   displaying a graphical representation of only the particular route selected on a map on the display module, the graphical representation of the particular route representing the particular route in its entirety by default, wherein the graphical representation of the particular route and the plurality of available routes are displayed on the display module simultaneously without overlapping;
   receiving a command input, the command input including at least one of: an acceptance input or a rejection input; and
   communicating the selection of the particular route to a flight management system upon receiving the acceptance input.

16. The method of claim 15, further comprising:
   supporting a graphic control input, the graphic control input configured for at least one of: adjusting a magnification level of the graphical representation of the particular route or scrolling the graphical representation of the particular route.

17. The method of claim 15, further comprising:
   displaying a textual description of the particular route on the display module.

18. The method of claim 17, wherein the plurality of available routes, the graphical representation of the particular route and the textual description of the particular route are displayed simultaneously without overlapping.

19. The method of claim 15, further comprising:
   signaling a reception of a route received via the data communication device.

* * * * *